July 25, 1950 W. VAN B. ROBERTS 2,516,343
SHORT-RANGE CONTINUOUS WAVE RADAR SYSTEM
Filed Jan. 10, 1947
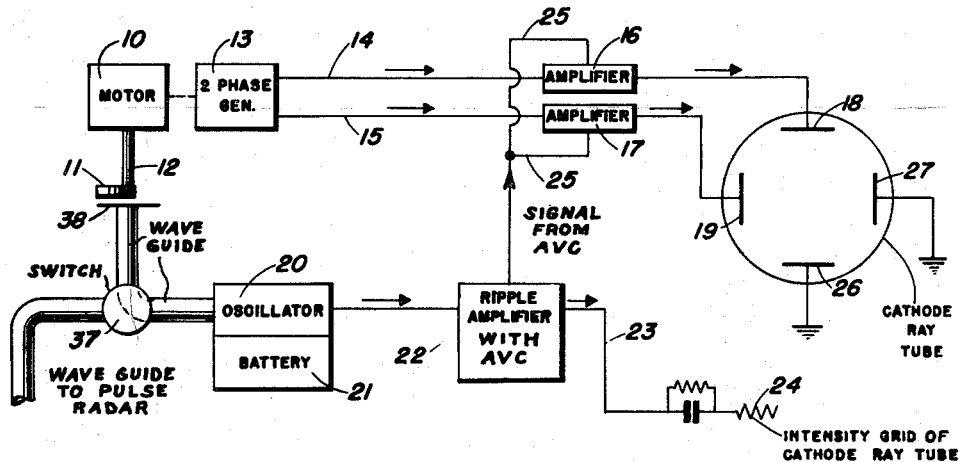
FIG. 1
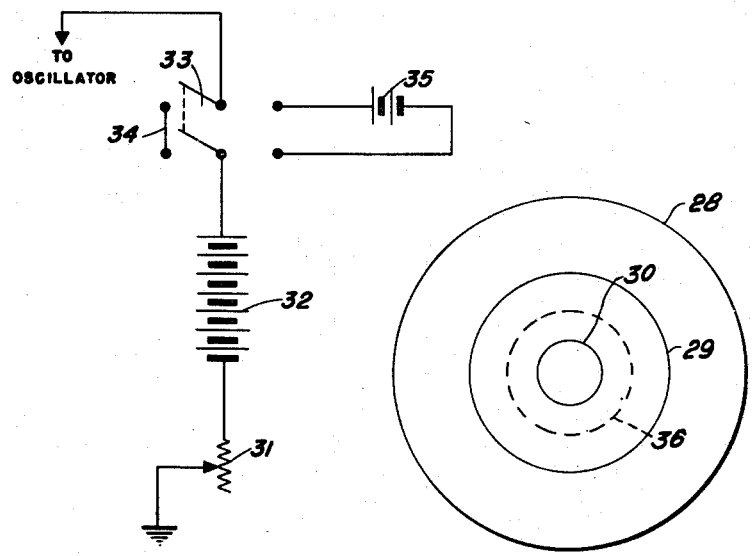
FIG. 2
FIG. 3
INVENTOR
WALTER VAN B. ROBERTS
BY
ATTORNEY Patented July 25, 1950

2,516,343

UNITED STATES PATENT OFFICE 2,516,343

SHORT-RANGE CONTINUOUS WAVE
RADAR SYSTEM

Walter van B. Roberts, Princeton, N. J., assignor
to the United States of America as represented
by the Secretary of the Navy Application January 10, 1947, Serial No. 721,193

6 Claims. (Cl. 343—9)

1

The present invention relates to radar.

An object of the invention is to extend the range of usefulness of radar, to include targets too close for satisfactory utilization of pulse radar.

Another object is to provide a suitable type of oscillator and other apparatus for use in this type of apparatus.

Briefly, the invention resides in utilizing an oscillator which continuously emits radiation, a portion of which is reflected from the moving target, said reflected portion having a frequency that has been altered slightly, in accordance with the well-known Doppler principle.

This reflected energy thus will produce ripples or beats with the initial radiation. A two-phase oscilloscope system is employed, whereby an elliptic trace may be produced on the screen of the cathode ray tube. The nature and size of this trace give the desired information as to range and direction of the moving target.

For a full understanding of the invention, reference should be made to the present specification of one embodiment thereof, and the accompanying drawing illustrating circuits that may be used.

In said drawing:

Figure 1 is a block diagram showing the electrical devices and their connections;

Figure 2 is a detail of an oscillation control circuit; and

Figure 3 is a representation of the fluorescent screen of a cathode ray tube that forms a part of the apparatus used in practising the invention.

Referring first to Fig. 1, there is shown a motor 10, operated by any suitable source of power, which rotates the eccentric disc 11 by means of the shaft 12. This forms a part of the pulse radar system. The motor 10 also drives a two-phase generator 13, in "synchronism" or unison with the disc 11, and said generator therefore produces two alternating voltages in unison with the rotation of said disc, and in quadrature with each other. These respective voltages will vary with the angular position of the generator shaft, according to the well-known sine law. By means of conductors 14 and 15, these voltages are fed separately to the two amplifiers 16 and 17, and the outputs of said amplifiers proceed to two of the oscilloscope plates, 18 and 19, the remaining plates 26 and 27 being grounded, as shown.

The rotary disc 11 serves to nutate the beam of radiation from the dipole 38. The received (reflected) impulses from the radar receiver are fed to the oscillator 20, energized preferably by a

2 battery 21, and the resulting ripples are applied to the input end of the ripple amplifier 22.

The output of this amplifier is fed to the intensity-control grid 24 of the oscilloscope tube through the conductor 23, a conventional grid-leak and condenser being interposed therein, as shown.

The amplifier 22 contains an automatic volume control, which gives a voltage determined by the intensity of the ripple. This voltage is applied as a grid bias to each of the amplifiers 16 and 17, through the conductor 25.

The cathode ray tube screen 28, Fig. 3, preferably has two circles marked thereon, in a readily visible color, such as red. The outer circle 29 and the inner circle 30 represent the limits between which extends the range of usefulness of the device.

The oscillator circuit embodies an anode voltage control, such for example as that shown in Fig. 2. This comprises a rheostat 31, and a source of voltage such as the battery 32, connected in series between the ground and the anode of the oscillator tube. A two-pole switch 33 is connected in the circuit in such way that when thrown to the left its blades will be short-circuited by the conductor 34, whereas when thrown to the right the battery 35 will be connected in the circuit in series with the battery 32, so as to increase the total anode voltage by a fixed amount.

The operation of the device is as follows:

Assume that a target is approaching, and is being tracked by the pulse radar. If its path is such that it will approach rather closely to the observer, a time will come when the pulse radar is no longer capable of giving accurate information, because the time interval between the emission of the signal and the arrival of the reflected "echo" is too small, as indicated by the absence of any visible separation between the transmitter pip and the echo pip on the screen of its cathode ray tube.

At this time, or shortly before, the present device becomes useful. By means of the switch 37, the connections are shifted to disconnect the pulse radar and substitute the new device in its place. The ripple voltage, that is, the beat between the transmitter frequency and the frequency of the echo signal, which differs from that of the transmitter because of the Doppler effect due to relative motion of the target and the observer, will increase in amplitude as the target approaches, and will produce a greater deflection of the electron beam in the cathode ray tube. As this beam sweeps the screen, it will trace an ellipse 36 due to the two-phase voltages on the two pairs of deflecting plates. If the two component voltages happen to be exactly equal, the trace will, of course, be a special form of ellipse with equal axes, namely a circle, as shown.

As stated, the increase of ripple voltage will increase the size of the trace. However, there are two limits to the useful range of the device. When the target is too distant, say over 500 yards, the ripples are too weak to give a good indication, hence the smaller circle 30 is used to show that the target is too distant. The other limit is reached when the target is too close for safety. This limit is indicated by the outer circle 29.

Consequently, the useful range of the present device lies between these two circles. The circle or ellipse constituting the trace is preferably broken up into dashes, for giving still further information. This is accomplished by adjusting the bias on amplifiers 16 and 17 until only the positive peaks of the ripples are shown on the screen, giving the appearance of a string of beads. The spacing of the beads will indicate the rate of approach of the target. If they are very close together, a rapid approach is indicated.

It has been noted that target range is indicated roughly by the size of the trace, and rate of approach by the number of "beads" in the trace. However, the most important information is target direction. This is shown by the relative brightness of the beads on the trace. For instance, if the beads at the top of the trace are brightest, the target lies above the mean direction of the beam. This is because the target is then nearer the center of the beam as it rotates past the upward position, and hence then produces the strongest ripples which thus affect the central grid 24 most strongly when the oscilloscope spot is at the top of circle 36. It will be understood that the position of the spot on circle 36 corresponds with the direction of the radiated beam.

The sensitivity of the oscillator may be adjusted by the means illustrated in Fig. 2. The switch 33 first is thrown to the left, completing the circuit without battery 35, and the rheostat 31 is then adjusted until oscillation just ceases. Then the switch is thrown to the right, so as to add the voltage due to battery 35, giving a fixed amount of excess anode voltage.

It will be understood, of course, that the pulse radar and the ripple radar are employed alternatively, a suitable conventional switching means, shown as a circle 37, being employed to shut off one when the other is in use. Thus when the ripple radar is in service, the pulse radar transmitter is not radiating energy, which otherwise would interfere with the former. However, the motor and generator 10 and 13, and the radiating system with leads thereto, are common to both systems and operate whenever either is in use.

This radar, perhaps, finds its most important use on night-fighting planes, when the enemy is too close for pulse radar to operate properly.

I claim:

1. A continuous wave radar system comprising a source of high frequency electro-magnetic energy, means for projecting a beam of said energy as a continuous radio wave, means for scanning an area with said beam, means for receiving the echo of said continuous wave from a target within said area, means for mixing said received and transmitted waves to obtain a signal of frequency variable in accordance with the relative speeds of said target and said source said signal having an intensity variable in accordance with the distance of said target from said source, an oscilloscope, means for causing the cathode ray of said oscilloscope to traverse a closed trace on the screen of said oscilloscope synchronously and in fixed phase relation with the scan of said area by said beam, means for altering the trace of said scan accordingly with changes in magnitude of said signal to produce a trace having a magnitude variable with the distance of said source to said target and means for altering the intensity of said trace synchronously with alterations in the intensity of said signal whereby the angular position of said target relative to the axis of scan of said beam will be indicated on said screen by the orientation of the maximum intensity of said trace.

2. A continuous wave radar system comprising a source of high frequency electro-magnetic energy, means for projecting a beam of said energy as a continuous radio wave, means for scanning an area with said beam, means for receiving the echo of said continuous wave from a target within said area, means for mixing said received and transmitted waves to obtain a signal of frequency variable in accordance with the relative speeds of said target and said source said signal having an intensity variable in accordance with the distance of said target from said source, a cathode ray oscilloscope having a fluorescent screen and at least mutually perpendicular cathode ray deflecting means, a source of two phase alternating current, potential means for applying separate phases from said source to a respective deflecting means of said oscilloscope through an amplitude control means for said potential for causing the cathode ray of said oscilloscope to traverse a closed trace on said screen with said ray synchronously and in fixed phase relation with the scan of said area by said beam, an automatic voltage control amplifier, means for feeding said signal to said amplifier, means for applying the output from said amplifier to said amplitude control, means for altering the trace of said scan accordingly with changes in magnitude of said amplified signal to produce an interrupted trace having a magnitude variable with the distance of said source to said target and a frequency of interruption variable with the relative speed between said target and said source, and means for altering the intensity of said trace synchronously with alterations in the intensity of said signal whereby the angular position of said target relative to the axis of scan of said beam will be indicated on said screen by the orientation of the maximum intensity of said trace, and the relative speed will be indicated by the frequency of said interruptions.

3. A continuous wave radar system comprising a source of high frequency electro-magnetic energy, means for projecting a beam of said energy as a continuous radio wave, means for scanning an area with said beam, means for receiving the echo of said continuous wave from a target within said area, means for mixing said received and transmitted waves to obtain a signal of frequency variable in accordance with the relative speeds of said target and said source said signal having an intensity variable in accordance with the distance of said target from said source, a cathode ray oscilloscope having a fluorescent screen and at least mutually perpendicular cathode ray deflecting means, means for causing the cathode ray of said oscilloscope to traverse a closed trace on said screen with said ray synchronously in fixed phase relation with the scan of said area by said beam, an automatic voltage control amplifier for said signal, means for altering the trace of said scan accordingly, with changes in magnitude of said amplified signal to produce an interrupted trace having a magnitude variable with the distance of said source to said target and a frequency of interruption variable with the relative speed between said target and said source, and means for altering the intensity of said trace synchronously with alterations in the intensity of said signal whereby the angular position of said target relative to the axis of scan of said beam will be indicated on said screen by the orientation of the maximum intensity of said trace, and the relative speed is indicated by the frequency of said interruptions.

4. A continuous wave radar system comprising a source of high frequency electro-magnetic energy, means for projecting a beam of said energy as a continuous radio wave, means for scanning an area with said beam, means for receiving the echo of said continuous wave from a target within said area, means for mixing said received and transmitted waves to obtain a signal of frequency variable in accordance with the relative speeds of said target and said source said signal having an intensity variable in accordance with the distance of said target from said source, a cathode ray oscilloscope having a fluorescent screen and at least mutually perpendicular cathode ray deflecting means, means for causing the cathode ray of said oscilloscope to traverse a closed trace on said screen with said ray synchronously in fixed phase relation with the scan of said area by said beam, an automatic voltage control amplifier for said signal, means for altering the trace of said scan accordingly, with changes in magnitude of said amplified signal to produce an interrupted trace having a magnitude variable with the distance of said source to said target and frequency of interruption variable with the relative speed between said target and said source whereby the relative speed of said target and source will be indicated by the frequency of said interruptions.

5. A continuous wave radar system comprising a source of high frequency electro-magnetic energy, means for projecting a beam of said energy as a continuous radio wave, means for scanning an area with said beam, means for receiving the echo of said continuous wave from a target within said area, means for mixing said received and transmitted waves to obtain a signal frequency variable in accordance with the relative speeds of said target and said source said signal having an intensity variable in accordance with the distance of said target from said source, a cathode ray oscilloscope having a fluorescent screen and at least mutually perpendicular cathode ray deflecting means, means for causing the cathode ray of said oscilloscope to traverse a closed trace on said screen with said ray synchronously in fixed phase relation with the scan of said area by said beam, an automatic voltage control amplifier, for said signal, means for altering the trace of said scan accordingly, with changes in magnitude of said amplified signal to produce a trace having a magnitude variable with the distance of said source to said target, and means for altering the intensity of said trace synchronously with alterations in the intensity of said signal whereby the angular position of said target relative to the axis of scan of said beam will be indicated on said screen by the orientation of the maximum intensity of said trace.

6. A continuous wave radar system comprising a source of high frequency electro-magnetic energy, means for projecting a beam of said energy as a continuous radio wave, means for scanning an area with said beam, means for receiving the echo of said continuous wave from a target within said area, means for mixing said received and transmitted waves to obtain a signal of frequency variable in accordance with the relative speeds of said target and said source said signal having an intensity variable in accordance with the distance of said target from said source, a cathode ray oscilloscope having a fluorescent screen and at least mutually perpendicular cathode ray deflecting means, a source of two phase alternating current potential, means for applying separate phases from said source to a respective deflecting means of said oscilloscope through an amplitude control means for said potential for causing the cathode ray of said oscilloscope to traverse a closed trace on said screen with said ray synchronously in fixed phase relation with the scan of said area by said beam, an automatic volume control amplifier, means for feeding said signal to said amplifier, and means for applying the output from said amplifier to said amplitude control means for altering the trace of said scan accordingly with changes in magnitude of said amplified signal to produce a trace having a magnitude variable with the distance of said source to said target.

WALTER VAN B. ROBERTS.

REFERENCES CITED

The following references are of record in the file of this patent:

UNITED STATES PATENTS

| Number | Name | Date |
|---|---|---|
| 2,223,224 | Newhouse | Nov. 26, 1940 |
| 2,405,281 | Bemis | Aug. 6, 1946 |
| 2,409,448 | Rost | Oct. 15, 1946 |
| 2,426,228 | Mackta | Aug. 26, 1947 |
| 2,459,074 | Hastings-Hodgkins | Jan. 11, 1949 |